(12) United States Patent
Newman et al.

(10) Patent No.: US 12,126,477 B2
(45) Date of Patent: *Oct. 22, 2024

(54) NOISE MITIGATION BY GUARD-SPACE REFERENCE CALIBRATION IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/208,928

(22) Filed: Jun. 13, 2023

(65) Prior Publication Data

US 2024/0080231 A1 Mar. 7, 2024

Related U.S. Application Data

(63) Continuation of application No. 17/970,950, filed on Oct. 21, 2022, now Pat. No. 11,799,707.

(60) Provisional application No. 63/412,654, filed on Oct. 3, 2022, provisional application No. 63/409,888, filed on Sep. 26, 2022, provisional application No. 63/403,924, filed on Sep. 6, 2022.

(51) Int. Cl.
*H04L 27/26* (2006.01)
*H04L 27/08* (2006.01)
*H04L 27/36* (2006.01)
*H04L 5/00* (2006.01)

(52) U.S. Cl.
CPC .......... *H04L 27/2607* (2013.01); *H04L 27/08* (2013.01); *H04L 27/362* (2013.01); *H04L 5/0007* (2013.01)

(58) Field of Classification Search
CPC ... H04L 27/2607; H04L 27/08; H04L 27/362; H04L 5/0007; H04L 5/0053; H04L 27/2605; H04L 27/261; H04L 27/2657; H04L 27/2675
USPC .......................................................... 370/329
See application file for complete search history.

(56) References Cited

U.S. PATENT DOCUMENTS

| | | |
|---|---|---|
| 2004/0114692 A1 | 6/2004 | Matsumoto |
| 2007/0297534 A1 | 12/2007 | Okunev |
| 2011/0044160 A1 | 2/2011 | Mujtaba |
| 2012/0281988 A1 | 11/2012 | Kikuchi |
| 2017/0180179 A1 | 6/2017 | Shi |
| 2017/0373909 A1 | 12/2017 | Hermando |
| 2018/0132122 A1 | 5/2018 | Yoo |
| 2018/0227929 A1 | 8/2018 | Yoo |
| 2018/0367275 A1 | 12/2018 | Nammi |

(Continued)

*Primary Examiner* — Tanmay K Shah (57) ABSTRACT

Noise and interference in 5G/6G messages can be corrected by including a predetermined reference signal in the guard space of each resource element of the message. Even highly variable noise and interference, fluctuating in time and in frequency, can be negated when the demodulation reference signals are positioned within each resource element of the message. In addition, if the guard-space reference signal varies excessively between resource elements, the associated message element can be flagged as likely faulted. Since the guard space is already included in the transmission, no additional resources or transmission power are required. Methods are also disclosed for retaining the signal processing features of prior-art guard space signals such as a cyclic prefix, at low to no cost.

20 Claims, 4 Drawing Sheets

(56) References Cited

U.S. PATENT DOCUMENTS

| | | |
|---|---|---|
| 2019/0190677 A1 | 6/2019 | Kim |
| 2019/0326964 A1 | 10/2019 | Li |
| 2020/0220689 A1 | 7/2020 | Hessler |
| 2020/0220763 A1 | 7/2020 | Montorsi |
| 2020/0322010 A1 | 10/2020 | Kim |
| 2020/0412592 A1 | 12/2020 | Akkarakaran |
| 2021/0044372 A1 | 2/2021 | Yang |
| 2021/0105166 A1 | 4/2021 | Khoshnevisan |
| 2021/0288863 A1* | 9/2021 | Ali Shah ............. H04L 27/2672 |

* cited by examiner

NOISE MITIGATION BY GUARD-SPACE REFERENCE CALIBRATION IN 5G AND 6G

PRIORITY CLAIMS AND RELATED APPLICATIONS

This application is a continuation of U.S. patent application Ser. No. 17/970,950, entitled "Guard-Space Phase-Tracking Reference Signal for 5G and 6G Networking", filed Oct. 21, 2022, which claims the benefit of U.S. Provisional Patent Application Ser. No. 63/412,654, entitled "Guard-Space Phase-Tracking Reference Signal for 5G and 6G Networking", filed Oct. 3, 2022, and U.S. Provisional Patent Application Ser. No. 63/403,924, entitled "Phase-Noise Mitigation at High Frequencies in 5G and 6G", filed Sep. 6, 2022, and U.S. Provisional Patent Application Ser. No. 63/409,888, entitled "Single-Branch Reference for High-Frequency Phase Tracking in 5G and 6G", filed Sep. 26, 2022, all of which are hereby incorporated by reference in their entireties.

FIELD OF THE INVENTION

The disclosure pertains to phase-noise mitigation in wireless messaging, and particularly to phase-noise mitigation at high frequencies.

BACKGROUND OF THE INVENTION

Wireless communication at very high frequencies, such as tens to hundreds of GHz, is needed for the massively increased demand in bandwidth and throughput expected in 5G and 6G. However, phase noise is an increasing problem at higher frequencies, preventing full usage of the bandwidth for messaging. What is needed is means for mitigating the phase noise so that the promise of high-speed messaging at high frequencies can be at least partially realized.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a wireless transmitter, the method comprising: transmitting a message comprising message elements, each message element comprising a single resource element of a resource grid, the resource grid comprising symbol-times in time and subcarriers in frequency; wherein each message element comprises a guard space followed by message data; wherein the message data of each message element is modulated according to bits of the message; wherein the guard space of each message element comprises a reference signal; and wherein the reference signal comprises a predetermined reference amplitude and a predetermined reference phase.

In another aspect, there is a method for a wireless receiver, the method comprising: receiving a message comprising message elements, each message element comprising a single resource element of a resource grid, the resource grid comprising symbol-times in time and subcarriers in frequency, wherein each message element comprises a guard-space reference followed by message data; for each message element, measuring a reference modulation of the guard-space reference; for each message element, comparing the reference modulation to a predetermined modulation; for each message element, determining, according to the comparing, a correction comprising a difference between the reference modulation and the predetermined modulation; for each message element, measuring a message modulation of the message data; and for each message element, correcting the message modulation according to the correction.

In another aspect, there is a method for a wireless receiver, the method comprising: determining a modulation scheme comprising amplitude modulation according to a plurality of predetermined amplitude levels; receiving a frequency-spanning message comprising message elements, wherein the message elements occupy successive subcarriers of a single symbol-time of a resource grid; wherein each message element comprises a guard space followed by message data, the guard space comprising a guard-space reference signal; for each message element, determining a reference amplitude and a reference phase of the guard-space reference signal, and calculating a plurality of modulation levels according to the reference amplitude or the reference phase; for each message element, determining a message amplitude and a message phase of the message data; and demodulating the message data by comparing the message amplitude or the message phase to the plurality of modulation levels.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Systems and methods disclosed herein (the "systems" and "methods", also occasionally termed "embodiments" or "arrangements" or "versions" or "examples", generally according to present principles) can provide urgently needed wireless communication protocols for mitigating the effects of phase noise at high frequencies planned for late 5G and 6G communications. Disclosed herein is a "guard-space phase-tracking reference signal", or "guard-space reference" for short, which may be transmitted in the guard space of each resource element of a message. In each resource element, the guard-space reference may occupy a first portion of the symbol-time, and the message data may occupy a second portion of the symbol-time. The guard-space reference may be configured to reveal current amplitude noise and/or phase noise, enabling the receiver to subtract those noise values from the associated message data, thereby providing enhanced reliability and enabling high-frequency communication.

Wireless messages are generally transmitted in frequency-spanning OFDM symbols. Each message element is transmitted as a message data portion of one subcarrier and one symbol-time, that is, a portion of one resource element. In addition, a "guard space" is generally provided in each resource element, before the message data and concatenated with the message data. In prior art, the guard space has usually been transmitted as a cyclic prefix, which is a copy of a portion of the message data. The cyclic prefix may be configured to preserve orthogonality between subcarriers, prevent interference between symbols, accommodate a range of arrival times, and provide signal circularity to simplify certain signal-processing operations. However, as a copy of the message data, the cyclic prefix simply repeats the same noise effects as the rest of the message data, and thus provides no assistance is mitigating noise. In contrast, the guard-space references disclosed herein differ from the prior art in that the disclosed guard-space references may be configured to reveal and measure phase noise and/or amplitude noise. The disclosed guard-space references can thereby enable the receiver to mitigate noise effects in the associated message data, and thereby avoid message faults even at high frequencies, according to some embodiments. In addition, examples show how the guard-space references can preserve subcarrier orthogonality, prevent inter-symbol interference, accommodate a wide range of signal arrival times, and provide the mentioned circularity and signal-processing advantages, all while also providing much-needed noise mitigation at high frequencies, according to some embodiments.

Some embodiments of the guard-space reference and the message data are transmitted and received according to an amplitude-modulated I-branch signal, multiplexed with an orthogonal amplitude-modulated Q-branch signal. Thus the guard-space reference may have an I-branch amplitude transmitted with an initial amplitude, such as the predetermined maximum amplitude of the modulation scheme, while the Q-branch amplitude may be transmitted with another amplitude, such as zero amplitude, and the message I and Q branches may be amplitude-modulated according to the various predetermined amplitude levels of the modulation scheme. Then the receiver can receive the guard-space reference, measure the reference I and Q amplitudes, determine the amplitude noise and phase noise effects, and subtract the noise effects from the message data, as detailed below.

In a first embodiment, the receiver can receive the guard-space reference and the message data in two orthogonal I and Q branches, and correct the message I and Q branch amplitudes to negate the noise effects. In a second embodiment, the receiver can receive the message data and the guard-space reference according to their sum-signal amplitude and phase instead of the branch amplitudes, and then correct the message sum-signal amplitude and phase, and demodulate with amplitude and phase mitigation, without the use of separate branch signals. In a third alternative, the receiver can receive the message data and the guard-space reference as orthogonal I and Q branches, and can then calculate a sum-signal amplitude and phase from them, and demodulate according to the corrected sum-signal amplitude and phase. Although each of these embodiments, and other examples below, may be used to mitigate noise, some versions provide greater noise tolerance overall and other advantages, as discussed below. The receiver is expected to know how the initial amplitude and phase of the guard-space reference is formatted. The receiver can calculate the phase rotation angle and the amplitude correction value from the guard-space reference in each case, and apply the mitigation to the associated message data.

Phase noise generally rotates the sum-signal phase, which also intermingles the I and Q signals, while leaving the overall sum-signal amplitude unchanged. Amplitude noise generally alters the sum-signal amplitude and the two branch amplitudes, without altering the sum-signal phase. The receiver can then determine a phase rotation angle from a ratio of the received I and Q amplitudes of the guard-space reference (minus an initial phase, if any), and an amplitude correction value according to the received sum-signal amplitude of the guard-space reference. Alternatively, the receiver can measure the sum-signal amplitude and sum-signal phase directly from the received raw sum-signal waveform, determine the amplitude correction from the sum-signal amplitude, and determine the phase correction from the sum-signal phase. In either case, the receiver can then negate both phase and amplitude noise by subtracting the amplitude and phase corrections from the message element associated with the guard-space reference, according to some embodiments.

No distinction is made herein between random thermal noise and signal interference, all of which are included in "noise". Pathological electronic effects such as transmitter saturation and receiver nonlinearities, are treated as noise or are ignored. Only additive amplitude noise and additive phase noise are considered herein, since this encompasses the vast majority of noise-based message faults. The receiver can quantitatively determine the amplitude and phase noise from the guard-space reference modulation, then subtract those noise values from the associated message data, to mitigate the noise.

The examples presented below are suitable for adoption by a wireless standards organization. Standardizing the guard-space reference may thereby provide the benefits of automatic and transparent phase-noise mitigation, at negligible cost in power and resources, benefitting future wireless users worldwide, in 5G and 6G and beyond.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "sub-channel" in some references). Symbol periods may be termed "OFDM symbols" (Orthogonal Frequency-Division Multiplexing) in references. The time domain may be divided into ten-millisecond frames, one-millisecond sub-frames, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "quadrature" or "PAM" (pulse-amplitude) modulation refers to two signals, separately amplitude-modulated, and then multiplexed and transmitted with a 90-degree phase shift between them. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. QPSK is phase modulated but not amplitude modulated. 16QAM may be modulated according to PAM which exhibits two phase levels at zero and 90 degrees (or in practice, for carrier suppression, ±45 degrees) and four amplitude levels including two positive and two negative amplitude levels, thus forming 16 distinct modulation states. For comparison, classical amplitude-phase modulation in 16QAM includes four positive amplitude levels and four phases of the raw signal, which are multiplexed to produce the 16 states of the modulation scheme. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal.

In addition to the 3GPP terms, the following terms are defined herein. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" or "reference elements" modulated according to the modulation scheme of the message and configured to exhibit levels of the modulation scheme (as opposed to conveying data). Thus integer Nref is the number of reference resource elements in the demodulation reference. As mentioned, a "guard-space reference" is a phase-tracking and/or demodulation reference transmitted in the guard space of a symbol-time. A "calibration set" is one or more amplitude levels and/or phase levels, which have been determined according to a demodulation reference, representing the predetermined modulation levels of a modulation scheme. A "short-form" demodulation reference is a demodulation reference that exhibits the maximum and minimum amplitude levels of the modulation scheme, from which the receiver can determine any intermediate levels by interpolation. "RF" or radio-frequency refers to electromagnetic waves in the MHz (megahertz) or GHz (gigahertz) frequency ranges. "Phase noise" is random noise or time jitter that alters the phase of a received signal, usually without significantly affecting the overall amplitude. "Phase-noise tolerance" is a measure of how much phase alteration can be imposed on an allowed modulation state without causing a demodulation fault. "Amplitude noise" includes additive noise or interference that primarily affects amplitudes of received signals. Interference due to competing signals is treated as noise herein, unless otherwise specified. A "faulted" message has at least one incorrectly demodulated message element, that is, the bit-level demodulation of the message element is not equal to the initial bit-level content of the message element before transmission. A "phase fault" is a message element demodulated as a state differing in phase from the intended modulation state, whereas an "amplitude fault" is a message element demodulated as a state differing in amplitude from the intended modulation state.

Referring to quadrature or PAM modulation, an "I-Q" space is an abstract two-dimensional space defined by an I-branch amplitude and an orthogonal Q-branch amplitude, in which each transmitted message element occupies one of several predetermined I-Q states of a modulation scheme. When the orthogonal branches are called "real" and "imaginary", the I-Q space is sometimes called the "complex plane". The "sum-signal" is the vector sum of the received I and Q branch signals, which generally equals the raw, as-received "overall" signal, aside from signal processing artifacts which are ignored. A "vector sum" is a sum of two vectors, which in this case represent the amplitudes and phases of the two orthogonal branches in I-Q space. The as-received sum-signal has a sum-signal amplitude and a sum-signal phase that can be measured. The sum-signal amplitude, equal to the square root of the sum of the I and Q branch amplitudes squared (the "root-sum-square" of I and Q). The sum-signal phase is equal to the arctangent of a ratio of the I and Q signal amplitudes (plus an initial phase, when present). When the message element is received at a receiver, the I and Q amplitudes may be substantially different from the transmitted values due to phase noise, which generally intermingles the two branches, and amplitude noise, which generally alters both branch amplitudes. Phase noise tends to change the ratio of I and Q amplitudes, whereas amplitude noise tends to change the overall sum-signal amplitude.

Turning now to the figures, a prior-art modulation scheme is susceptible to phase noise at high frequencies.

Figure 1A:
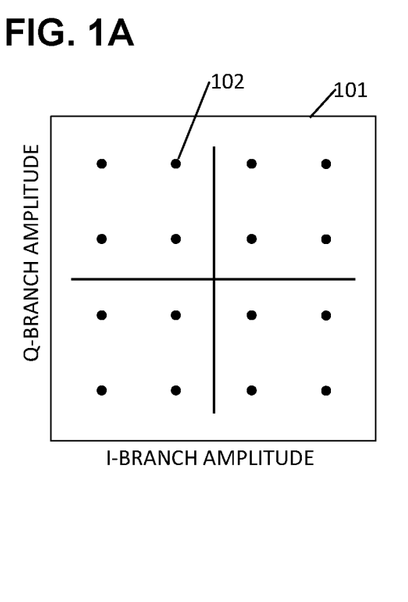
FIG. 1A is a schematic showing an exemplary embodiment of a 16QAM constellation chart, according to prior art.

FIG. 1A is a schematic showing an exemplary embodiment of a 16QAM constellation chart, according to prior art. As depicted in this prior-art example, a modulation scheme 101 includes 16 allowed modulation states 102, each allowed state determined by an I-branch signal and a Q-branch signal orthogonal to the I-branch signal (for example, the Q-branch phase-modulated at 90 degrees relative to the I-branch). The horizontal axis shows the amplitude modulation of the I-branch signal, and the vertical axis shows the amplitude modulation of the Q-branch signal, each branch being amplitude-modulated at one of certain predetermined amplitude levels of the modulation scheme. In this case, the predetermined amplitude levels are −3, −1, +1, and +3 arbitrary units. The various amplitude levels are equally separated and symmetrical around zero. The central cross-shape represents zero amplitude. Negative amplitude levels are equivalent to a 180-degree phase change. There are 16 states, as expected for 16QAM. A receiver can receive a message element modulated according to this modulation scheme, and can extract the I and Q branches separately by analog or digital signal-processing means. The receiver can then measure the amplitudes of those two branches, compare the measured amplitude values to a predetermined set of amplitude levels, select the closest match to each branch amplitude, and thereby determine the modulation state of the message element. 16QAM encodes 4 bits per message element.

Figure 1B:
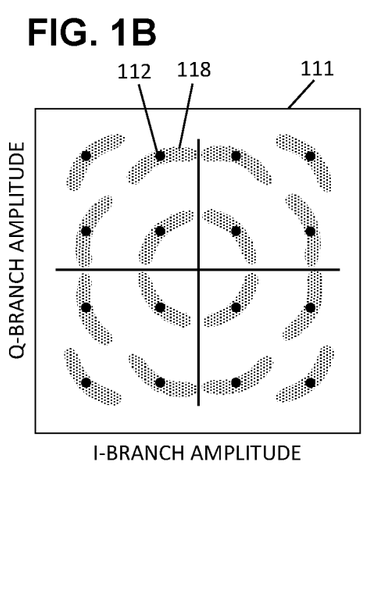
FIG. 1B is a schematic showing an exemplary embodiment of the effect of phase noise on a 16QAM constellation chart, according to prior art.

FIG. 1B is a schematic showing an exemplary embodiment of the effect of phase noise on a 16QAM constellation chart, according to prior art. As depicted in this prior-art example, the modulation states 112 of a 16QAM constellation chart 111 can be distorted ("smeared out") by phase noise in a characteristic way as indicated by phase distortion clouds 118. The depicted distortions would be caused by moderate phase noise at moderate frequencies; at high frequencies it is much worse. If the same modulation scheme were attempted at the much higher frequencies planned for future wireless operation, the phase noise would be much larger than depicted, and the phase-noise clouds would substantially overlap, resulting in frequent message faults. Hence the need for strategies to enable communication despite strong phase distortions.

Figure 2A:
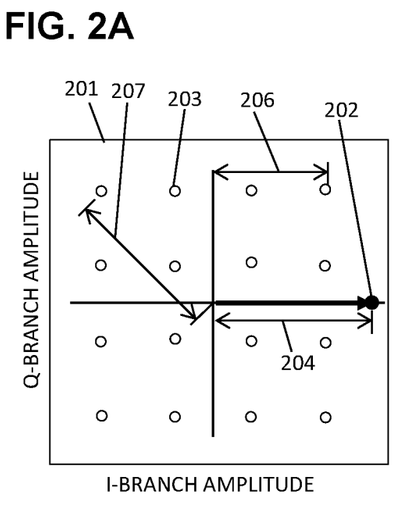
FIG. 2A is a schematic showing an exemplary embodiment of a guard-space phase-tracking reference signal as transmitted, according to some embodiments.

FIG. 2A is a schematic showing an exemplary embodiment of a guard-space reference signal as transmitted, according to some embodiments. As depicted in this non-limiting example, a constellation chart 201 for 16QAM is shown with various modulation states as circles 203 indicating the I and Q branch amplitudes of each state 203. The modulation scheme includes various predetermined amplitude levels (four, in this case: −3, −1, +1, +3 arbitrary units). The maximum branch amplitude (+3 units) is indicated as 206, and the maximum sum-signal amplitude is indicated as 207. The maximum sum-signal amplitude 207 is the total amplitude when both the I and Q branches have the maximum branch amplitude 206. Also shown is a single dot (with bold arrow) indicating a guard-space reference 202, as transmitted by a transmitter. In this case, the initial I-branch of the guard-space reference 202 is amplitude-modulated according to the maximum sum-signal amplitude level 204 or 207 of the modulation scheme, while the initial Q-branch has zero amplitude.

The maximum sum-signal amplitude 207 is the net amplitude produced when both branches have the maximum branch amplitude 206. Numerically, the maximum sum-signal amplitude 207 equals √2 times the maximum branch amplitude 206. For example, if the maximum branch amplitude 206 is 3 units, then the maximum sum-signal amplitude 204 is 4.24 units (all numerical results are quoted within ±1%). The sum-signal phase of the guard-space reference is initially zero degrees because the Q amplitude is zero, as-transmitted in this case. The same guard-space reference, with the same modulation and format, is usually transmitted in the guard space of every resource element of the resource grid, or at least the resource elements that have message data. Hence, the receiver always knows what to expect in the guard-space references. Also, making the guard-space references all the same can simplify the averaging of multiple guard-space references to improve accuracy.

The as-transmitted guard-space reference 202, in this case, is distinct from the 16QAM states 203, in that (a) none of the 16QAM states has a branch with zero amplitude, (b) none of the 16QAM states has a branch amplitude transmitted with √2 times the maximum branch amplitude, and (c) none of the 16QAM states has a sum-signal phase of zero degrees, whereas the depicted guard-space reference 202 has all of those features, in this example. In other embodiments, the guard-space reference may be transmitted with any initial sum-signal amplitude and sum-signal phase, as long as the receiver knows what they are. For example, the guard-space reference may be configured with the maximum sum-signal amplitude 207 and a sum-signal phase of 45 degrees, thereby providing carrier suppression. Alternatively, the guard-space reference may be configured with the maximum branch amplitude 206 in the Q-branch and zero in the I-branch, thereby having a sum-signal phase of 90 degrees. Many other combinations are possible.

The guard-space reference 202 is configured to reveal the effects of phase noise and amplitude noise, thereby enabling the receiver to measure and negate those effects. The phase noise effect generally rotates the sum-signal phase, and therefore alters the relative amplitudes of the I and Q branches. The amplitude noise effect is generally to alter the sum-signal amplitude, and therefore alters the I and Q branch amplitudes proportionally, without changing the phase. The receiver can determine the amplitude noise and phase noise effects explicitly, by measuring either the sum-signal amplitude and phase, or the I and Q branch amplitudes, of the guard-space reference, and comparing to the initial values. The receiver can then apply corresponding mitigation to the associated message element, and then can compare the corrected sum-signal amplitude and phase, or the corrected I and Q branch amplitudes, to predetermined levels of the modulation schema. The receiver can thereby demodulate the message element with the effects of phase noise and amplitude noise largely mitigated.

The guard-space reference 202 may provide features similar to those of the conventional cyclic prefix. For example, orthogonality between subcarriers may be enforced by programming a whole integer number of wavelengths (or more precisely, an integer number of wave periods corresponding to the subcarrier frequency) in the guard-space reference and the associated message data together. In addition, the guard-space reference may prevent interference between symbols by providing a stable interval of known phase and amplitude between temporally successive symbols. In addition, the guard-space reference may accommodate a range of arrival times from users near and far, when configured sufficiently long in time ("sufficiently long" depending on the size of the network). In addition, the guard-space reference may simplify certain signal-processing operations, such as FFT (fast Fourier transformation), by providing the same fixed signal in the two guard spaces before and after each message element. The guard-space references fore and aft of the message data may thereby provide signal circularity, just as the cyclic prefix did in prior-art messages. To summarize: the guard-space references can provide substantially equivalent features as the prior-art cyclic prefix, while also providing amplitude and phase noise mitigation, according to some embodiments.

Figure 2B:
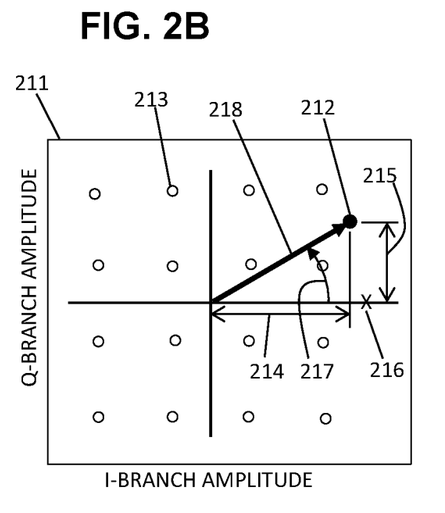
FIG. 2B is a schematic showing an exemplary embodiment of a guard-space phase-tracking reference signal as received, according to some embodiments.

FIG. 2B is a schematic showing an exemplary embodiment of a guard-space reference as received, according to some embodiments. As depicted in this non-limiting example, a constellation chart 211, such as that of the previous figure, includes 16QAM modulation states 213. Also shown is a guard-space reference 212 as-received including phase noise that rotates the I and Q branches through an angle 217 relative to the initial phase. In this case, the initial phase is zero degrees. For comparison, the initial transmitted signal is indicated as an "X" 216. There is no amplitude noise in this example.

The as-received I-branch amplitude 214 has been reduced relative to the initial transmitted I-branch amplitude 204 due to the phase rotation, and the Q-branch amplitude 215 has been increased as shown. However, the received sum-signal amplitude 218 is unchanged from the transmitted sum-signal amplitude 204, since the magnitude is unchanged by a phase rotation, absent amplitude noise.

Operationally, the receiver can measure the amplitudes of the as-received I and Q branches of the guard-space reference, calculate the phase rotation angle (as arctan(Q/I)), and then correct the associated message element's I and Q amplitudes by de-rotating the message values by the negative of the phase rotation angle, thereby removing the effect of phase noise on the message. For example, the receiver can extract the reference I and Q branches of the guard-space reference as-received, and can extract the message I and Q branches of the message data as-received. The receiver can then determine a phase rotation angle according to the reference I and Q amplitudes of the guard-space reference, and de-rotate the message data by that phase rotation angle. In this case, the initial transmitted reference Q amplitude was zero, so the reference sum-signal phase of the transmitted guard-space reference is also zero. Hence the phase rotation angle is simply the as-received reference sum-signal phase of the guard-space reference. In other examples below, the guard-space reference is transmitted with a non-zero reference sum-signal phase, in which case the phase rotation angle equals the reference sum-signal phase of the received guard-space reference minus the initial transmitted sum-signal phase.

The receiver can mitigate the phase noise by de-rotating the message I and Q amplitudes of the message data by the phase rotation angle, as determined from the associated guard-space reference. For example, the receiver can calculate a message sum-signal phase of the associated message element (as arctan(Q/I) of the message element) and a message sum-signal amplitude (as the root-sum-square of the received message I and Q amplitudes). The receiver can then subtract the phase rotation angle from the message sum-signal phase, and can thereby calculate corrected I and Q branch amplitudes of the message element with effects of phase noise removed. For example, the corrected message I amplitude may be determined as R cos(θc) and Q as R sin(θc) respectively, where θc is the corrected sum-signal phase (which equals the received message sum-signal phase minus the phase rotation angle), and R is given by $\sqrt{(I^2+Q^2)}$, which is the message sum-signal amplitude.

Optionally, the same phase correction, using the same phase rotation angle, may be applied to other message elements which are in other subcarriers at the same symbol-time as the guard-space reference (that is, the phase correction can be applied to multiple message elements in a single OFDM symbol, spanning multiple subcarriers). It is not necessary that the various resource elements belong to the same message, since the guard-space references in this example are all identically formatted. In addition, the phase noise correction may also be applied to message elements in other symbol-times which are closely proximate to the guard-space reference.

The guard-space reference can also mitigate amplitude noise. First, the receiver can calculate the reference sum-signal amplitude of the guard-space reference as-received, and then determine an amplitude correction equal to the received sum-signal amplitude minus the transmitted sum-signal amplitude. (The initial amplitude level may be determined from a prior demodulation reference, for example.) The receiver can then correct the message element sum-signal amplitude by subtracting that amplitude correction from the message element sum-signal amplitude. Assuming that the message data has the same noise amplitude as the associated guard-space reference (since they are directly concatenated), the receiver can subtract the amplitude correction from the message sum-signal amplitude, thereby determining a corrected sum-signal amplitude of the message data. The receiver can then demodulate the message element by either (a) comparing the corrected sum-signal amplitude to a set of predetermined sum-signal amplitude levels of the modulation scheme, or (b) calculating corrected I and Q branch amplitudes and comparing the corrected branch amplitudes to a set of predetermined branch amplitude levels of the modulation scheme. By either method, the receiver has demodulated the message element with the additive amplitude noise largely negated.

The receiver is expected to know, from system information messages or unicast downlink messages or otherwise, the configuration or format of the guard-space reference. The "configuration" or "format" of the guard-space reference includes the transmitted reference I and Q branch amplitudes, or alternatively the transmitted reference sum-signal amplitude and sum-signal phase, or both sets of parameters. With either set of parameters (branches or sum-signals), the receiver can then calculate a phase rotation angle and an amplitude correction, apply phase mitigation and amplitude mitigation to the received message as described, and can then demodulate the message element by comparing the corrected branch amplitudes or the corrected sum-signal amplitude and phase to a set of predetermined modulation levels, thereby selecting the closest one of the predetermined levels. In either case, the receiver can mitigate both phase and amplitude noise, according to some embodiments.

Figure 3:
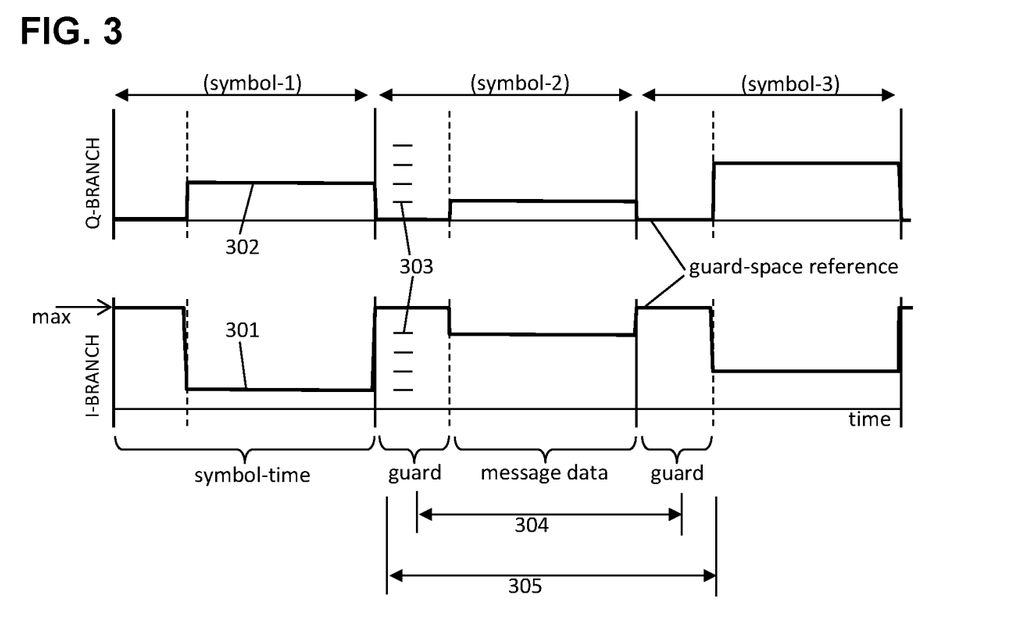
FIG. 3 is a schematic showing an exemplary embodiment of a message including guard-space phase-tracking reference signals, according to some embodiments.

FIG. 3 is a schematic showing an exemplary embodiment of a message including guard-space phase-tracking reference signals, according to some embodiments. As depicted in this non-limiting example, the amplitudes of three symbol-times are shown, including three guard spaces and three message data regions. The Q-branch amplitude is shown in bold line in the top row, and the I-branch amplitude 301 is shown in the bottom row. The three successive symbol-times are labeled as symbol-1, 2, and 3. The horizontal axis is time, divided into three symbol-times as shown. Each symbol-time is further divided, by a dashed line, into a guard space interval and a message data interval.

The four predetermined branch amplitudes of the modulation scheme 303 are shown as bars, in this case 1, 2, 3, 4 arbitrary units. (For simplicity, RF oscillations are suppressed and only positive amplitudes are included.) Also indicated on the I-branch row by a "max" arrow is the maximum sum-signal amplitude of the modulation scheme, which equals √2 times the largest branch amplitude. The largest branch amplitude is 4, and the largest sum-signal amplitude is 5.66 arbitrary units, for the case shown (to within 1%). The guard-space reference in the third symbol-time is specifically labeled.

All three guard-space references have the same sum-signal amplitude and phase, as-transmitted. Specifically, the guard-space references are transmitted with the maximum sum-signal amplitude in the I-branch and zero in the Q-branch. In contrast, the message data portions are variously modulated to encode the message information. For example, the message I branch is amplitude modulated according to one of the predetermined branch amplitude levels 303 in each message element, and likewise for the Q branch. The specific branch amplitudes of the message data depend on the content of each message element. Thus the guard-space references are all modulated the same way by the transmitter, whereas the message data portions are modulated according to the various amplitude levels of the modulation scheme, according to the content of the message.

The receiver can receive the transmitted signals, which are generally altered by phase noise and amplitude noise. For example, phase noise can rotate the I-branch 301 and the Q-branch 302 to different values without altering the overall sum-signal amplitude, and amplitude noise can alter the overall sum-signal amplitude without changing the phase. The receiver can measure the amplitude noise effect and the phase noise effect on the guard-space reference, and can then correct the associated message data by subtracting those effects. For example, the receiver can receive one of the symbol-times, including the guard-space reference portion and the associated message data portion of the symbol-time. The receiver can measure the reference I and Q amplitudes of the guard-space reference, and calculate a reference sum-signal amplitude as the square root of a sum of the received reference I and Q amplitudes squared (that is, root-sum-square of the reference I and Q amplitudes). The receiver can also calculate the reference sum-signal phase as the arctangent of the received reference Q amplitude divided by the reference I amplitude. In this case the Q branch was transmitted with zero amplitude, hence zero initial phase. The phase rotation angle, in this case, equals the reference sum-signal phase as-received. The receiver can then negate the phase noise in the associated message data, by de-rotating the message I and Q signals of the message data according to the phase rotation angle. In addition, the receiver can mitigate amplitude noise by measuring the reference sum-signal amplitude, calculating an amplitude correction equal to the received reference sum-signal amplitude minus the predetermined maximum sum-signal amplitude level. The receiver can then mitigate amplitude noise by subtracting the amplitude correction from the received message sum-signal amplitude, and then calculate the corrected I and Q amplitudes accordingly. The receiver can then demodulate the message by comparing the phase-corrected and amplitude-corrected message I and Q amplitudes to the predetermined amplitude levels of the modulation scheme, thereby largely removing the effects of both phase noise and amplitude noise. (Alternatively, as mentioned, the receiver can demodulate the message element by comparing the sum-signal amplitude and phase to appropriate predetermined levels, and thereby avoid the step of converting the corrected sum-signal back to the I-Q space.)

The depicted guard-space references can also provide benefits previously provided by a prior-art cyclic prefix. The transmitter can configure the modulation of the reference I-branch in the same way as the message data, by providing a whole number of wave periods, according to the subcarrier frequency, in the guard-space reference and the message data together. Such a configuration can preserve orthogonality between subcarriers by arranging that the overlap of two adjacent subcarrier signals, integrated over the symbol-time, cancels to zero in first order. In addition, the guard-space reference can be made longer in time than the largest range of signal arrival times, thereby avoiding interference between user messages from users at short and long distances. In addition, the receiver can perform signal processing (such as transformations) using the message data together with the two adjacent guard-space references, which are identically configured. For example, the receiver can process each message data interval along with one-half of the preceding guard-space reference and one-half of the following guard-space reference, as indicated by 304 in the figure. Alternatively, a larger range including the whole preceding and following guard-space references can be included, as indicated as 305. By providing the same waveform before and after the message data, the guard-space references can perform the same function as a cyclic prefix. Thus the guard-space references disclosed herein can provide the features previously provided by the cyclic prefix, while also providing mitigation for phase noise and amplitude noise based on signals received directly adjacent to each message element, according to some embodiments.

Although the figure depicts three symbols sequential in time, the three symbols may equally well be simultaneous and present on successive subcarriers of a single OFDM symbol. Alternatively, the three symbol-times of the figure may represent three successive message elements of three different frequency-spanning messages, each transmitted in sequential symbol-times. It is immaterial whether the message is transmitted time-spanning or frequency-spanning, as long as each message element is associated with an adjacent guard-space reference, all with the same format, as shown.

Figure 4:
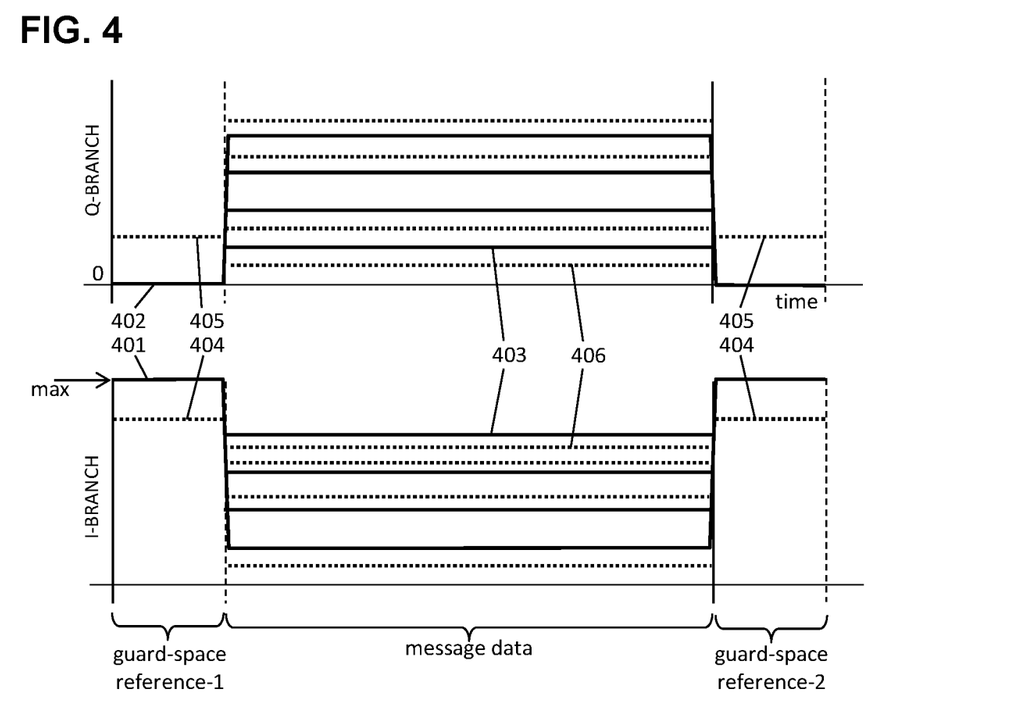
FIG. 4 is a schematic showing an expanded view of an exemplary embodiment of a message including guard-space phase-tracking reference signals, according to some embodiments.

FIG. 4 is a schematic showing an expanded view of an exemplary embodiment of a message including guard-space phase-tracking reference signals, according to some embodiments. As depicted in this non-limiting example, signals of an I-branch 401 are shown along with signals of a Q-branch 402, with time horizontal. The figure includes the guard space interval and the associated message data interval of a first symbol-time, plus the guard space interval of a second symbol-time. Each guard space interval includes signals modulated as a guard-space reference, according to some embodiments.

The transmitted I and Q amplitudes are shown as heavy lines. The first guard space, preceding the message data, is labeled guard-space reference-1. The second guard space, following the message data, is labeled guard-space reference-2. The two guard-space references are modulated in the same way, with the reference I-branch 401 having the maximum sum-signal amplitude, and the reference Q-branch 402 having zero amplitude, as transmitted. Also shown are four predetermined amplitude levels 403 of the modulation scheme representing, for example, 1, 2, 3, 4 arbitrary units of amplitude. The message I-branch and the message Q-branch are modulated, in the message data portion, according to one of the four predetermined amplitude levels 403, depending on the message content.

Also shown are dotted lines representing the I and Q amplitudes of the two guard-space references as-received at the receiver. The received reference I and Q amplitudes 404, 405 are different from the transmitted reference I and Q amplitudes 401, 402 due to phase noise. In the depicted case, the first and second guard space signals are both shown with the same phase rotation angle, indicating that the phase noise has not changed significantly during the message portion. For each of the guard-space references, the received reference I-branch amplitude 404 (altered by phase noise) is lower than the maximum sum-signal amplitude, due to phase rotation. Likewise, the received Q-branch amplitude 405 is higher than zero, due to phase rotation mixing the I and Q branches in each of the guard-space references.

The message data was also altered by the same phase noise as the two guard-space references, specifically by undergoing a phase rotation or mixing the received message I and Q branch amplitudes. The phase noise distorts the amplitudes of the message data as shown, very schematically, by dotted lines 406. The depicted amount of phase noise would cause the message data to be incorrectly demodulated, resulting in many phase faults. However, the receiver can use the guard-space references to negate the phase noise effects and correctly demodulate the message. For example, the receiver can determine the phase rotation angle according to a ratio of the received reference Q amplitude 405 divided by the received reference I amplitude 404 in the preceding guard-space reference, and can therefore de-rotate the received message I and Q amplitudes to remove the phase noise effects. The receiver can also calculate the received reference sum-signal amplitude based on the received reference I and Q amplitudes 404, 405 in the preceding guard-space reference, calculate an amplitude correction value equal to the received reference sum-signal amplitude minus the predetermined maximum sum-signal amplitude of the modulation scheme, and thereby measure the amount of amplitude noise. The receiver can then correct the received message sum-signal amplitude to negate that amplitude noise by subtracting the amplitude correction from the received message sum-signal amplitude, and then calculate the corrected message I and Q amplitudes according to the de-rotated sum-signal phase. The receiver can thereby produce corrected and de-rotated message I and Q branch amplitudes for demodulation, with the amplitude noise and phase noise largely negated, according to some embodiments.

As an option, the receiver can average the received reference I amplitudes in the preceding and following guard-space references, and can likewise average the preceding and following reference Q amplitudes. The receiver may thereby determine a more precise value of the phase rotation angle and the amplitude correction value. The receiver can then de-rotate and amplitude-correct the message branch amplitudes using those average values. In addition, the receiver can determine how rapidly the amplitude noise and/or the phase noise varies between the two guard-space references, by comparing the I and Q branch amplitudes of the two guard-space references, or alternatively compare the two sum-signal amplitudes and sum-signal phases of the two guard-space references.

As a further option, the receiver can calculate a block-averaged value of the phase rotation angle, by measuring the guard-space references in multiple subcarriers at the same symbol-time and averaging those values. Since most sources of phase noise, such as receiver clock jitter, tend to rotate all of the subcarrier signals by the same amount, the receiver may substantially improve the precision of the phase rotation angle by averaging multiple guard-space references in multiple subcarriers of the same OFDM symbol. Likewise, the receiver may obtain a more precise amplitude correction value by averaging the received reference sum-signal amplitudes from multiple subcarriers in the same OFDM symbol, as long as the amplitude noise does not vary strongly with frequency. To check that assumption, the receiver can determine whether the amplitude noise varies with frequency by comparing the first and last values in the block of guard-space references, or by calculating a statistical metric (such as the standard deviation) of the sum-signal amplitudes of the guard-space references, or other test. If such a test shows that the amplitude noise varies with frequency across the multiple subcarriers, then the receiver can abandon the averaging and use the local values derived from each guard-space reference for amplitude correction. The phase noise, on the other hand, is usually sufficiently frequency-independent that such averaging generally provides an improved phase noise mitigation.

Figure 5:
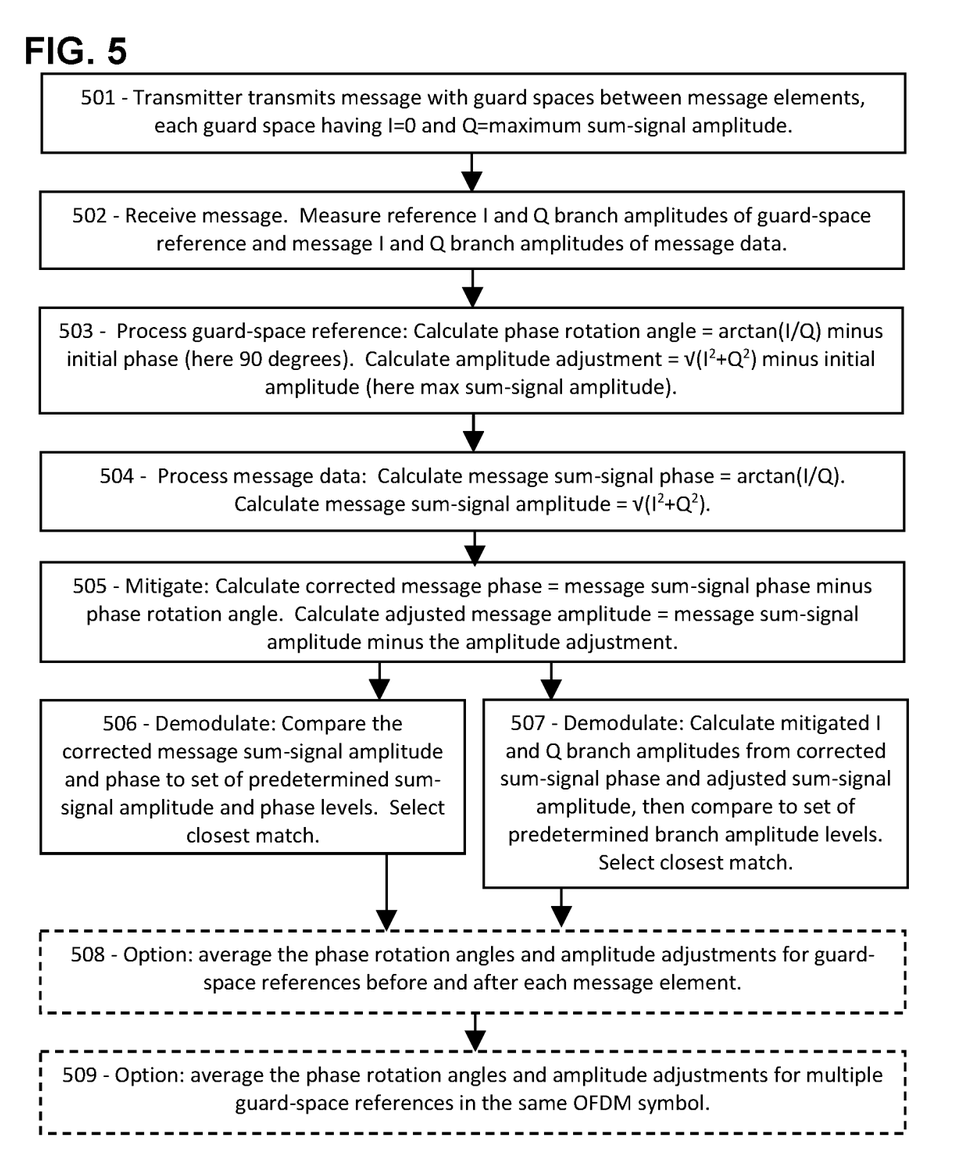
FIG. 5 is a flowchart showing an exemplary embodiment of a procedure for mitigating phase noise in a message, according to some embodiments.

FIG. 5 is a flowchart showing an exemplary embodiment of a procedure for mitigating phase noise in a message, according to some embodiments. The steps are not necessarily depicted in chronological order. As depicted in this non-limiting example, at 501 a transmitter transmits a message of message elements modulated as I and orthogonal Q signals. Each message element is associated with a guard space, which in this case includes a guard-space reference configured to negate phase noise and amplitude noise. Unlike the previous example, the guard-space references of this example have a maximum amplitude in the Q-branch and zero amplitude in the I-branch. Hence, the initial phase (the reference sum-signal phase as-transmitted) is 90 degrees instead of zero.

At 502, a receiver receives the message and measures the I and Q amplitudes for the message elements and the guard-space references. At 503, the receiver processes the guard-space reference by calculating the reference sum-signal phase (as arctan(Q/I) of the guard-space reference) and the reference sum-signal amplitude (as root-sum-square of reference I and Q amplitudes). The receiver then calculates a phase rotation angle equal to the reference sum-signal phase minus an initial phase (which in this case is 90 degrees), and an amplitude correction equal to the reference sum-signal amplitude minus the initial amplitude.

At 504, the receiver processes each message data by calculating a message sum-signal amplitude and a message sum-signal phase according to the same formulas as in 503. At 505, the receiver mitigates the noise by subtracting the phase rotation angle from the message sum-signal phase, and subtracting the amplitude correction from the message sum-signal amplitude.

At that point, there are two paths to complete the demodulation and identify the content of the message element. At 506, the receiver compares the corrected message sum-signal amplitude and the corrected message sum-signal phase to a set of predetermined sum-signal amplitudes and phases of the modulation scheme, and selects the closest match as representing the message element's content. Alternatively, at 507, the receiver calculates a mitigated I-branch amplitude as the corrected message sum-signal amplitude times the cosine of the corrected message sum-signal phase, and calculates a mitigated Q-branch amplitude as a sine of the corrected message sum-signal phase. The receiver can then compare the mitigated I and Q amplitudes to a predetermined set of branch amplitude levels, selecting the closest match. The message is thereby demodulated with amplitude noise and phase noise negated.

As an option, at 508 (if not sooner) the receiver can average the reference sum-signal amplitudes and phases of the two guard-space references occurring before and after the message data, to determine a more accurate value of the phase rotation angle and the amplitude correction. Alternatively, the receiver can average the reference I and Q branch amplitudes of those two guard-space references and then calculate the phase rotation angle therefrom. As a further alternative, the receiver can calculate two values of the phase rotation angle, and likewise two values of the amplitude correction, based on the two guard-space references, and then average those values. In each case, the receiver may obtain a more accurate determination of the phase noise effect and the amplitude noise effect.

As a further alternative, at 509 (if not sooner) the receiver may average the reference I and Q amplitudes (or the reference sum-signal amplitudes and phases, or the calculated phase rotation angles and amplitude corrections) of a large number of simultaneous guard-space references, and obtain a more precise value of the phase rotation angle and the amplitude correction from those averages.

Figure 6:
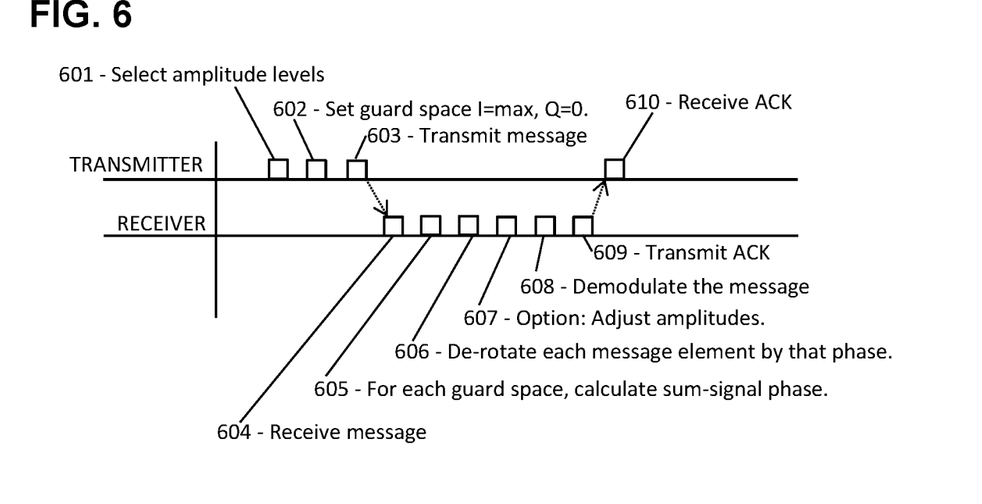
FIG. 6 is a sequence chart showing an exemplary embodiment of a procedure for transmitting and receiving a message with phase-noise mitigation, according to some embodiments.

FIG. 6 is a sequence chart showing an exemplary embodiment of a procedure for transmitting and receiving a message with phase-noise mitigation, according to some embodiments. As depicted in this non-limiting example, actions of a transmitter are shown on the first line, actions of a receiver on the second line, and time is horizontal with arrows showing causation. At 601, a transmitter determines a modulation scheme that includes certain predetermined amplitude levels, used for quadrature amplitude modulation of orthogonal branch signals. At 602, the transmitter inserts, in guard spaces between intervals of modulated message data, guard-space references in which the I-branch has the maximum sum-signal amplitude level of the modulation scheme, and the Q-branch has zero amplitude. At 603, the transmitter then transmits the message, including message data alternated or interleaved with identical guard-space references.

At 604, the receiver receives the message including the modulated message data intervals and the guard-space references. At 605, for each message element, the receiver analyzes the guard-space reference associated with that message element. For example, the receiver can determine a reference sum-signal amplitude and a reference sum-signal phase of the guard-space reference according to the as-received sum-signal. Alternatively, the receiver can separate orthogonal branches of the signal and measure the reference I-branch amplitude and the reference Q-branch amplitude of the guard-space reference. If the guard-space reference had a Q-branch amplitude of zero as transmitted, then the initial sum-signal phase is also zero, in which case the phase rotation angle equals the received reference sum-signal phase. If the transmitted reference sum-signal phase is some other value, such as 45 degrees or 90 degrees, the receiver can determine the phase rotation angle by subtracting the transmitted (initial) reference sum-signal phase from the received reference sum-signal phase. The receiver can then de-rotate the message elements by that phase rotation angle to mitigate the phase noise. The receiver is expected to know the format of the transmitted guard-space reference, including the initial reference sum-signal phase and amplitude.

At 606, the receiver can mitigate phase noise effects in each message element by de-rotating the message I-branch amplitude and the message Q-branch amplitude according to the phase rotation angle of the associated guard-space reference. Alternatively, the receiver can determine a message sum-signal amplitude and phase from the sum-signal, and subtract the phase rotation angle from the message sum-signal phase. In either case the receiver can thereby determine a corrected message I-branch amplitude and a corrected Q-branch amplitude (or a corrected message sum-signal phase) with the phase noise largely negated. The manner of receiving the signals, performing signal processing, measuring amplitudes and phases, and applying the noise mitigation, using either sum-signals or I-Q branches, may be dependent on the particular implementation.

At 607, the receiver can mitigate amplitude noise effects in each message element by calculating an amplitude correction value equal to the received reference sum-signal amplitude minus the initial sum-signal amplitude. For example, the receiver may have previously determined the predetermined amplitude levels of the modulation scheme, and has already calculated the maximum sum-signal amplitude level. The receiver can then mitigate amplitude noise by subtracting the amplitude correction value from the received message sum-signal amplitude. The receiver can then compare the corrected sum-signal amplitude to a set of predetermined sum-signal amplitude levels of the modulation scheme, or it can recalculate the I-branch amplitude and Q-branch amplitude trigonometrically using the corrected sum-signal amplitude. By either calculation, the phase-corrected and amplitude-corrected levels are ready for demodulation.

At 608, the receiver can then demodulate the message element by comparing the corrected message I and Q amplitudes to the predetermined amplitude levels, and can thereby determine the message content with phase noise and amplitude noise mitigated. At 609, the receiver transmits an acknowledgement which the transmitter receives at 610.

Thus the message has been transmitted including a guard-space reference associated concatenated with each message element, and has been received at the receiver with the message data and the guard-space references distorted by amplitude noise and phase noise. The receiver has used the received amplitudes in the guard-space reference to measure the phase noise and amplitude noise, and has negated the effects of the noise in the message I and Q branch amplitudes, before demodulating the message data.

Figure 7:
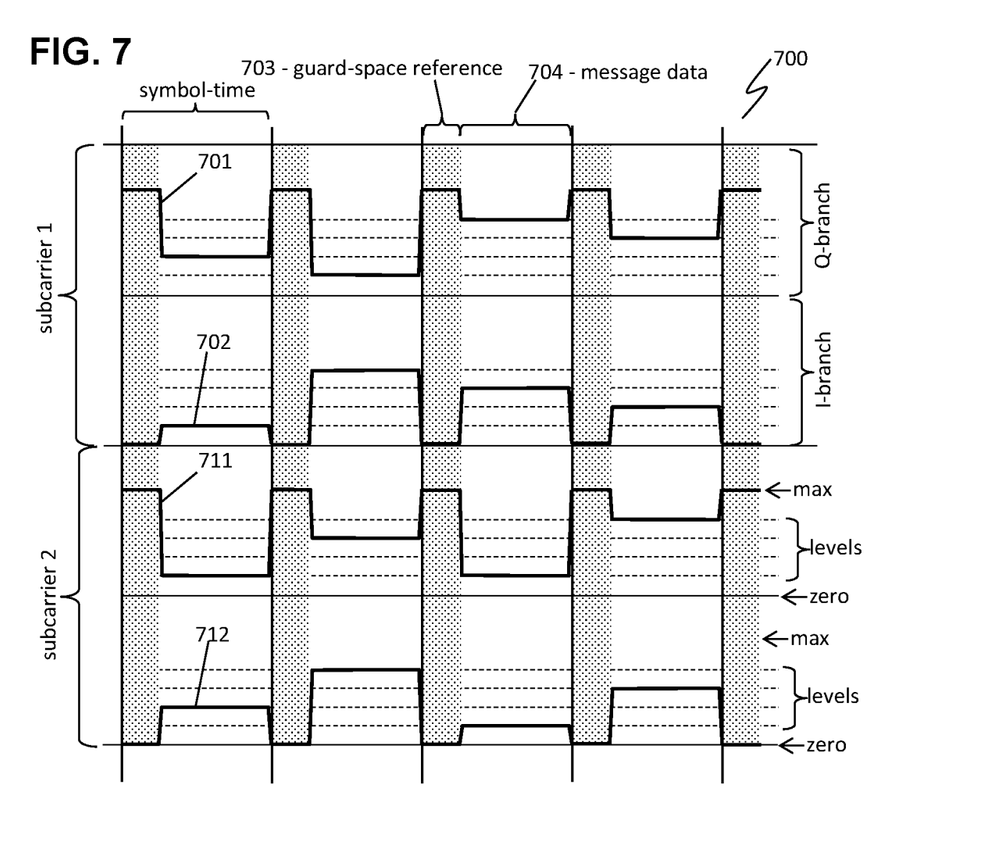
FIG. 7 is a schematic showing an exemplary embodiment of a resource grid comprising guard-space references, according to some embodiments.

FIG. 7 is a schematic showing an exemplary embodiment of a resource grid including guard-space references, according to some embodiments. As depicted in this non-limiting example, a small portion of a resource grid 700 shows two subcarriers (subcarrier-1 and subcarrier-2) at four successive symbol-times. Subcarrier-1 includes a Q-branch signal 701 and an I-branch signal 702, while subcarrier-2 includes another Q-branch and I-branch signals 711, 712. These are shown as transmitted by a transmitter, without noise. Guard spaces, shown stippled, share each symbol-time with message data as shown. Four dashed lines represent four predetermined branch amplitude levels of the modulation scheme (positive branch amplitudes only, for simplicity). On the right, the I and Q branches are indicated in the first subcarrier, while the four predetermined branch amplitude levels are indicated in the second subcarrier. Arrows also indicate zero amplitude and the maximum sum-signal amplitude. The maximum sum-signal amplitude equals $\sqrt{2}$ times the maximum branch amplitude, and therefore is higher than any of the predetermined branch amplitudes. Nevertheless, the transmitter can readily transmit the guard-space reference, because the power required for the maximum sum-signal amplitude is exactly the same as the power required for a message element in which both I and Q branches have the maximum branch amplitudes.

Each guard space includes a guard-space reference 703, which in this case includes a Q-branch amplitude equal to the maximum sum-signal amplitude, and an I-branch amplitude of zero; hence the initial sum-signal phase is 90 degrees. Each message data portion 704 includes transmission in the I and Q branches at one of the four predetermined branch amplitude levels. The branch amplitudes are selected, for each message element, according to the content of the message. Thus the message data portion 704 of each branch of each message element is shown with a different amplitude, selected from the set of predetermined branch amplitudes, to encode the message data. In contrast, all of the guard-space references 703 have the same format, which here is the maximum sum-signal amplitude in the reference Q-branch, and zero in the reference I-branch, as-transmitted.

The receiver can receive a message which is frequency-spanning (occupying successive subcarriers at a single symbol-time) or time-spanning (successive symbol-times at a particular subcarrier), as well as more complex shapes in the resource grid. In each case, the receiver can measure the reference I and Q amplitudes in the received guard-space reference 703, and the received message I and Q amplitudes in the message data 704 portion, of each resource element. However, the received amplitudes are likely distorted by amplitude noise and phase noise. The receiver can calculate a reference sum-signal amplitude based on a combination of the received reference I and Q branch amplitudes, and can also calculate the reference sum-signal phase according to a ratio of the received reference I and Q branch amplitudes. The receiver can likewise calculate the message sum-signal amplitude and phase from the received message I and Q branch amplitudes.

Then the receiver can determine the additive amplitude noise effect by subtracting the initial (as-transmitted) reference sum-signal amplitude from the received reference sum-signal amplitude. The receiver can then subtract the amplitude noise effect from the message sum-signal amplitude, thereby obtaining a corrected message sum-signal amplitude with the amplitude noise negated. The receiver can also determine a phase rotation angle equal to the reference sum-signal phase of the received guard-space reference, minus the initial transmitted guard-signal phase (which is 90 degrees here, but may have other values). The receiver can then subtract the phase rotation angle from the message sum-signal phase, thereby obtaining a message sum-signal phase with the phase noise negated.

Having removed both phase and amplitude noise, the receiver can then demodulate the message. In a first embodiment, the receiver can demodulate each message element by comparing the corrected sum-signal amplitude to a predetermined set of amplitude levels, and the corrected sum-signal phase to a predetermined set of phase levels of the modulation scheme. Alternatively, in a second embodiment, the receiver can calculate the corrected message I and Q amplitudes from the corrected sum-signal phase and the corrected sum-signal amplitude, and can then compare the corrected message I and Q branch amplitudes to a set of predetermined branch amplitude levels of the modulation scheme. In either case, the receiver has used the information in the guard-space reference to negate phase noise and amplitude noise in the associated message data.

Due to the many options and variations disclosed herein, and other versions derived therefrom by artisans after reading this disclosure, it would be helpful for a wireless standards committee to establish conventions governing the use, incidence, and formats of guard-space references, so that future wireless users can enjoy phase noise mitigation and amplitude noise mitigation, transparently, with each communication.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed here embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a wireless transmitter, the method comprising:
   a) transmitting a message comprising message elements, each message element comprising a single resource element of a resource grid, the resource grid comprising symbol-times in time and subcarriers in frequency;
   b) wherein each message element comprises a guard space followed by message data;
   c) wherein the message data of each message element is modulated according to bits of the message;
   d) wherein the guard space of each message element comprises a reference signal; and
   e) wherein the reference signal comprises a predetermined reference amplitude and a predetermined reference phase.

2. The method of claim 1, wherein the message is transmitted according to 5G or 6G technology.

3. The method of claim 1, wherein successive message elements of the message occupy successive symbol-times at a particular subcarrier.

4. The method of claim 1, wherein successive message elements of the message occupy successive subcarriers at a particular symbol-time.

5. The method of claim 1, wherein:
   a) the message data is modulated according to a modulation scheme comprising orthogonal amplitude modulated I and Q branches, the amplitude modulation according to a plurality of predetermined branch amplitudes of the modulation scheme;
   b) wherein the plurality of predetermined branch amplitudes include a maximum branch amplitude; and
   c) the predetermined reference amplitude equals the maximum branch amplitude.

6. The method of claim 1, wherein:
   a) the message data is modulated according to a modulation scheme comprising orthogonal amplitude modulated I and Q branches, the amplitude modulation according to a plurality of predetermined branch amplitudes of the modulation scheme;
   b) wherein the plurality of predetermined branch amplitudes includes a maximum branch amplitude; and
   c) the predetermined reference amplitude equals 2 times the maximum branch amplitude.

7. The method of claim 1, wherein:
   a) the message data is modulated according to a modulation scheme comprising orthogonal amplitude modulated I and Q branches, the amplitude modulation according to a plurality of predetermined branch amplitudes of the modulation scheme; and
   b) the predetermined reference amplitude is different from all of the predetermined branch amplitudes of the plurality.

8. The method of claim 1, wherein:
   a) the message data comprises a waveform modulated according to a modulation scheme, wherein the waveform comprises a waveform amplitude multiplexed with a waveform phase;
   b) the waveform amplitude of each message data is amplitude modulated according to a first plurality of predetermined amplitude levels, and the waveform phase of each message data is phase modulated according to a second plurality of predetermined phase levels; and
   c) the predetermined reference phase is different from all of the predetermined phase levels of the second plurality.

9. The method of claim 1, wherein the predetermined reference phase is zero degrees.

10. A method for a wireless receiver, the method comprising:
    a) receiving a message comprising message elements, each message element comprising a single resource element of a resource grid, the resource grid comprising symbol-times in time and subcarriers in frequency, wherein each message element comprises a guard-space reference followed by message data;
    b) for each message element, measuring a reference modulation of the guard-space reference;
    c) for each message element, comparing the reference modulation to a predetermined modulation;
    d) for each message element, determining, according to the comparing, a correction comprising a difference between the reference modulation and the predetermined modulation;
    e) for each message element, measuring a message modulation of the message data; and
    f) for each message element, correcting the message modulation according to the correction.

11. The method of claim 10, wherein the measuring a message modulation of each message element comprises:
    a) determining a waveform amplitude and a waveform phase of the message data;
    b) comparing the waveform amplitude to a first plurality of predetermined amplitude levels of a modulation scheme, and thereby selecting a closest predetermined amplitude level to the waveform amplitude; and
    c) comparing the waveform phase to a second plurality of predetermined phase levels of the modulation scheme, and thereby selecting a closest predetermined phase level to the waveform phase.

12. The method of claim 11, wherein the correcting the message modulation comprises:
    a) for each message element, subtracting a phase of the reference modulation from the waveform phase of the message data.

13. The method of claim 10, wherein the measuring a message modulation of each message element comprises:

a) measuring two orthogonal branch amplitudes of the message data; and b) calculating a message phase according to a ratio of the two orthogonal branch amplitudes.

14. The method of claim 13, wherein the correcting the message modulation of each message element comprises:

a) measuring two orthogonal branch amplitudes of the reference modulation, and calculating a phase rotation angle according to a ratio of the two orthogonal branch amplitudes of the reference modulation;

b) subtracting the phase rotation angle from the message phase, thereby determining a corrected message phase; and c) calculating two corrected branch amplitudes according to the corrected message phase.

15. The method of claim 10, further comprising:

a) for each message element, measuring a second reference modulation comprising a second guard-space reference, wherein the second guard-space reference comprises a second resource element that follows the message element;

b) for each message element, averaging the reference modulation and the second reference modulation, thereby determining an average reference modulation; and c) for each message element, determining the correction according to the average reference modulation.

16. The method of claim 15, further comprising:

a) for each message element, calculating a difference between the reference modulation of the message element and the second reference modulation; and b) upon determining that the difference between the reference modulation of the message element and the second reference modulation exceeds a predetermined limit, determining that the message data of the message element cannot be corrected.

17. A method for a wireless receiver, the method comprising:

a) determining a modulation scheme comprising amplitude modulation according to a plurality of predetermined amplitude levels;

b) receiving a frequency-spanning message comprising message elements, wherein the message elements occupy successive subcarriers of a single symbol-time of a resource grid;

c) wherein each message element comprises a guard space followed by message data, the guard space comprising a guard-space reference signal;

d) for each message element, determining a reference amplitude and a reference phase of the guard-space reference signal, and calculating a plurality of modulation levels according to the reference amplitude or the reference phase;

e) for each message element, determining a message amplitude and a message phase of the message data; and f) demodulating the message data by comparing the message amplitude or the message phase to the plurality of modulation levels.

18. The method of claim 17, further comprising:

a) for each message element, determining a phase rotation angle comprising a difference between the reference phase and a predetermined phase, and subtracting the phase rotation angle from the message phase.

19. The method of claim 17, wherein:

a) for each message element, the message data comprises an amplitude-modulated I branch multiplexed with an orthogonal amplitude-modulated Q branch; and b) wherein the method further comprises, for each message element, determining the message phase according to an arctangent of a ratio of an amplitude of the Q branch divided by an amplitude of the I branch.

20. The method of claim 19, further comprising, for each message element, subtracting the reference phase from the message phase.

* * * * *